United States Patent [19]  
Murata et al.

[11] Patent Number: 4,814,313  
[45] Date of Patent: Mar. 21, 1989

[54] METHOD OF PRODUCTION OF CATALYST CARRIER FOR POLYMERIZATION OF OLEFIN

[75] Inventors: Masahide Murata; Masafumi Imai; Hiroyuki Furuhashi; Kouji Maruyama; Hiroshi Ueno, all of Saitama, Japan

[73] Assignee: TOA Nenryo Kogyo Kabushiki Kaisha, Tokyo, Japan

[21] Appl. No.: 132,752

[22] Filed: Dec. 14, 1987

[30] Foreign Application Priority Data

Dec. 26, 1986 [JP] Japan ................. 61-308536

[51] Int. Cl.$^4$ .............. C08F 4/64; C08F 4/02
[52] U.S. Cl. .................. 502/111; 502/115; 502/116; 502/121; 502/125
[58] Field of Search ........... 502/111, 115, 116, 121, 502/125

[56] References Cited

U.S. PATENT DOCUMENTS

| | | | |
|---|---|---|---|
| 3,953,414 | 4/1976 | Galli et al. | 526/348 |
| 4,111,835 | 9/1978 | Feschini et al. | 252/429 |
| 4,220,554 | 9/1980 | Scata et al. | 502/125 |
| 4,311,817 | 1/1982 | Morita et al. | 526/124 |
| 4,315,835 | 2/1982 | Scata et al. | 252/429 |
| 4,339,351 | 7/1982 | Mashita et al. | 502/125 X |
| 4,370,257 | 1/1983 | Imai et al. | 502/125 |
| 4,399,054 | 8/1983 | Ferraris et al. | 252/429 B |
| 4,401,589 | 9/1983 | Kioka et al. | 252/429 B |
| 4,613,579 | 9/1986 | Furuhashi et al. | 502/125 X |
| 4,693,990 | 9/1987 | Horoyuki et al. | 502/125 X |

FOREIGN PATENT DOCUMENTS 045977 2/1982 European Pat. Off.  
137694 2/1981 Japan .

*Primary Examiner*—Patrick P. Garvin  
*Attorney, Agent, or Firm*—M. B. Kurtzman

[57] ABSTRACT

A method for the production of a catalyst carrier for use in the polymerization of an olefin, which method comprises causing a magnesium-containing solid obtained by contact of (A) magnesium metal, (B) a halogenated hydrocarbon represented by the general formula, RX wherein R stands for an alkyl, aryl, or cycloalkyl group having 1 to 20 carbon atoms and X for a halogen atom, and (C) a compound of the general formula, $X_n^1 M(OR^1)_{m-n}$ wherein $X^1$ stands for a hydrogen atom, a halogen atom, or a hydrocarbon group having 1 to 20 carbon atoms, M for a boron, carbon, silicon, aluminum, or phosphorus atom, $R^1$ for a hydrocarbon group having 1 to 20 carbon atoms, and m for the valency of said atom M, providing that $m > n \geq 0$ is satisfied, to contact (D) a halogen-containing alcohol.

8 Claims, 1 Drawing Sheet

METHOD OF PRODUCTION OF CATALYST CARRIER FOR POLYMERIZATION OF OLEFIN

DETAILED DESCRIPTION OF THE INVENTION

1. Field of the Invention

This invention relates to a method for the production of a catalyst carrier for use in the polymerization of an olefin.

2. Description of the Prior Art

A magnesium-carried catalyst having a transition metal component such as titanium deposited on a magnesium compound-containing carrier and intended for use in the polymerization of an olefin has been known to the art. More often than not in the preparation of the catalyst, the carrier therefore is used after it has been mechanically pulverized. In this case, the produced catalyst for polymerization and consequently the polymer obtained therewith consist of particles which are devoid of uniformity in shape.

Recently, a few attempts are being made to improve the shape of particles of a carrier. For example, a method which comprises converting an aqueous magnesium chloride solution or dissolved magnesium chloride hydrate ($MgCl_2 \cdot 6H_2O$) through spray drying into spherical particles (U.S. Pat. No. 3,953,414 of Galli et al. issued Apr. 27, 1976, U.S. Pat. No. 4,111,835 of Feschini et al. Sept. 5, 1978, and U.S. Pat. No. 4,311,817 of Morita et al. issued Jan. 19, 1982), a method which comprises mutually contacting magnesium metal, a halogenated hydrocarbon, and an electron donor type compound such as an alcohol (Japanese Patent Application Disclosure SHO 51(1976)-64,586), a method which comprises causing an organic magnesium compound to react with an ester of orthosilicic acid, and a method which comprises causing mutual reaction of an ester of orthosilicic acid and a halogenated hydrocarbon (U.S. Pat. No. 4,220,554 of Scata et al. issued Sept. 2, 1980) have been proposed. Indeed these methods are capable of improving the shapes of particles of a carrier and a catalyst to some extent. The catalysts they produce, however, are not satisfactory in terms of activity.

The present inventors formerly found that a magnesium-containing solid consisting of particles uniform in shape and effectively serving as a carrier for an olefin polymerization catalyst is obtained by causing contact of magnesium metal, a halogenated hydrocarbon, and a compound of the general formula, $X_mC(OR)_{4-m}$ (U.S. Pat. No. 4,370,257 of Imai et al. issued Jan. 25, 1983). The catalyst prepared by using this solid, however, has an unsolved problem concerning the activity for polymerization.

PROBLEM FOR SOLUTION BY THE INVENTION

An object of this invention is to provide a catalyst carrier for the polymerization of an olefin, excelling in the quality of particles and exhibiting efficiency in polymerization on a practical level.

INVENTION FOR SOLUTION OF THE PROBLEM

After a diligent study, the present inventors have found that the object of this invention can be accomplished by a magnesium-containing solid produced by contact of the magnesium-containing solid disclosed in U.S. Pat. No. 4,370,257 of Imai et al. issued Jan. 25, 1983 and U.S. Pat. No. 4,220,554 of Scata et al. issued Sept. 2, 1980 mentioned above with a halogen-containing alcohol. The present invention has been perfected as the result.

SUMMARY OF THE INVENTION

The essence of the present invention resides in a method for the production of a catalyst carrier, and the catalyst carrier obtained therefrom, for use in the polymerization of an olefin, which method comprises causing a magnesium-containing solid obtained by contact of (A) magnesium metal, (B) a halogenated hydrocarbon represented by the general formula, RX, wherein R stands for an alkyl, aryl, or cycloalkyl group having 1 to 20 carbon atoms and X for a halogen atom, and (C) a compound of the general formula, $X_n^1M(OR^1)_{m-n}$, wherein $X^1$ stands for a hydrogen atom, a halogen atom, or a hydrocarbon group having 1 to 20 carbon atoms, M for a boron, carbon, silicon, aluminum, or phosphorous atom, $R^1$ for a hydrocarbon group having 1 to 20 carbon atoms, and m for the valency of said atom M, providing that $m > n \geq 0$ to contact (D) a halogen-containing alcohol.

RAW MATERIALS FOR PREPARATION OF CARRIER

(A) Magnesium Metal

Though this invention does not discriminate magnesium metal on account of its form, magnesium metal is used particularly advantageously herein in the form of powder or chips. Preparatorily to actual use herein, the magnesium metal is desired to be washed with an inactive hydrocarbon such as, for example, an aliphatic, alicyclic, or aromatic hydrocarbon having 6 to 8 carbon atoms and then dried by heating in the presence of an inactive gas such as nitrogen.

(B) Halogenated Hydrocarbon

Of the halogenated hydrocarbons represented by the general formula, RX, particularly desirable are chlorinated or brominated hydrocarbons containing as the substituent, R, an alkyl, aryl, or cycloalkyl group having 1 to 8 carbon atoms. To be concrete, such particularly desirable halogenated hydrocarbons include methyl, ethyl, isopropyl, n-butyl, n-octyl, and cyclohexyl chlorides bromides, chlorobenzene, and o-chlorotoluene, for example.

(C) Compound of General Formula, $X_n^1M(OR^1)_{m-n}$

In the formula, the symbols M, $X^1$, $R^1$, m, and n have the same meanings as defined above. The substituent, $X^1$, may be a halogen-substituted hydrocarbon having 1 to 20 carbon atoms. Where $X^1$ is a hydrocarbon group, $X^1$ and $R^1$ may be equal or unequal. Hereinafter, the compounds of the aforementioned general formula will be referred to simply as "alkoxy compounds."

As examples of the hydrocarbon group, there can be cited alkyl groups such as methyl, ethyl, propyl, i-propyl, butyl, amyl, hexyl, octyl, 2-ethylhexyl, and decyl, cycloalkyl groups such as cyclopentyl, cyclohexyl, and methylcyclohexyl, alkenyl groups such as allyl, propenyl, and butynyl, aryl groups such as phenyl, tolyl, and xylyl, and aralkyl groups such as phenethyl and 3-phenylpropyl. Among other hydrocarbon groups enumerated above, alkyl groups of 1 to 10 carbon atoms prove to be particularly advantageous. Illustrative examples of the alkoxy compounds follow:

1. Compounds Using a Carbon Atom as the Substituent, M

The compounds of the formula, $C(OR^1)_4$, including $C(OCH_3)_4$, $C(OC_2H_5)_4$, $C(OC_3H_7)_4$, $C(OC_4H_9)_4$, $C(O-i-C_4H_9)_4$, $C(OC_6H_{13})_4$, and $C(OC_8H_{17})_4$; the compounds of the formula, $X^1C(OR^1)_3$, including $HC(OCH_3)_3$, $HC(OC_2H_5)_3$, $HC(OC_3H_7)_3$, $HC(OC_4H_9)_3$, $HC(O-i-C_4H_9)_3$, $HC(OC_6H_{13})_3$, $HC(OC_8H_{17})_3$, $HC(OC_6H_5)_3$; $CH_3C(OCH_3)_3$, $CH_3C(OC_2H_5)_3$, $C_2H_5C(OCH_3)_3$, $C_2H_5C(OC_2H_5)_3$, $C_6H_{11}C(OC_2H_5)_3$, $C_6H_5C(OCH_3)_3$, $C_6H_5C(OC_2H_5)_3$, $C_6H_5C(OC_3H_7)_3$, $C_7H_7C(OC_2H_5)_3$, $C_8H_9C(OC_2H_5)_3$; $CH_2BrC(OC_2H_5)_3$, $CH_2ClC(OC_2H_5)_3$, $CH_3CHBrC(OC_2H_5)_3$, $CH_3CHClC(OC_2H_5)_3$; $ClC(OCH_3)_3$, $ClC(OC_2H_5)_3$, $ClC(OC_3H_7)_3$, $ClC(O-i-C_4H_9)_3$, $ClC(OC_8H_{17})_3$, $ClC(OC_6H_5)_3$, and $BrC(OC_2H_5)_3$; and the compounds of the formula, $X_2^1C(OR^1)_2$, including $CH_3CH(OCH_3)_2$, $CH_3CH(OC_2H_5)_2$, $CH_2(OCH_3)Hd 2$, $CH_2(OC_2H_5)_2$, $CH_2ClCH(OC_2H_5)_2$, $CHCl_2CH(OC_2H_5)_2$, $CCl_3CH(OC_2H_5)_2$, $CH_2BrCH(OC_2H_5)_2$, $CH_2ICH(OC_2H_5)_2$, and $C_6H_5CH(OC_2H_5)_2$.

2. Compounds Using a Silicon Atom as the Substituent, M

The compounds of the formula, $Si(OR^1)_4$, including $Si(OCH_3)_4$, $Si(OC_2H_5)_4$, $Si(OC_4H_9)_4$, $Si(Oi-C_4H_9)_4$, $Si(OC_6H_{13})_4$, $Si(OC_8H_{17})_4$, $Si[O.CH_2CH(C_2H_5)C_4H_9]_4$, and $Si(OC_6H_5)_4$; the compounds of the formula, $RSi(OR^1)_3$, including $HSi(OC_2H_5)_3$, $HSi(OC_4H_9)_3$, $HSi(OC_6H_{13})_3$, $HSi(OC_6H_5)_3$, $CH_3Si(OCH_3)_3$, $CH_3Si(OC_2H_5)_3$, $CH_3Si(OC_4H_9)_3$, $C_2H_5Si(OC_2H_5)_3$, $C_4H_9Si(OC_2H_5)_3$, $C_6H_5Si(OC_2H_5)_3$, $C_2H_5Si(OC_6H_5)_3$, $ClSi(OCH_3)_3$, $ClSi(OC_2H_5)_3$, $ClSi(OC_3H_7)_3$, $ClSi(OC_6H_5)_3$, and $BrSi(OC_2H_5)_3$; the compounds of the formula, $R_2Si(OR^1)_2$, including $(CH_3)_2Si(OCH_3)_2$, $(CH_3)_2Si(OC_2H_5)_2$, $(CH_3)_2Si(OC_3H_7)_2$, $(C_2H_5)_2Si(OC_2H_5)_2$, $(C_6H_5)_2Si(OC_2H_5)_2$, $CH_3ClSi(OC_2H_5)_2$, $CHCl_2SiH(OC_2H_5)_2$, $CCl_3SiH(OC_2H_5)_2$, $CH_3BrSi(OC_2H_5)_2$, and $CH_3ISi(OC_2H_5)_2$; and the compounds of the formula, $R_3SiOR^1$, including $(CH_3)_3SiOCH_3$, $(CH_3)_3SiOC_2H_5$, $(CH_3)_3SiOC_4H_9$, $(CH_3)_3SiOC_6H_5$, $(C_2H_5)_3SiOC_2H_5$, and $(C_6H_5)_3SiOC_2H_5$.

3. Compounds Using a Boron Atom as the Substituent, M

The compounds of the formula, $B(OR^1)_3$, including $B(OC_2H_5)_3$, $B(OC_4H_9)_3$, $B(OC_6H_{13})_3$, and $B(OC_6H_5)_3$.

4. Compounds Using an Aluminum Atom as the Substituent, M

The compounds of the formula, $Al(OR^1)_3$, including $Al(OCH_3)_3$, $Al(OC_2H_5)_3$, $Al(OC_3H_7)_3$, $Al(Oi-C_3H_7)_3$, $Al(OC_4H_9)_3$, $Al(Ot-C_4H_9)_3$, $Al(OC_6H_{13})_3$, and $Al(OC_6H_5)_3$.

5. Compounds Using a Phosphorous Atom as the Substituent, M

The compounds of the formula, $P(OR^1)_3$, including $P(OCH_3)_3$, $P(OC_2H_5)_3$, $P(OC_4H_9)_3$, $P(OC_6H_{13})_3$, and $P(OC_6H_5)_3$.

(D) Halogen-Containing Alcohol

The term "halogen-containing alcohol" as used in the present invention means a compound obtained from a monohydric or polyhydric alcohol containing one or more hydroxyl groups in the molecular unit thereof by substituting a halogen atom for at least one freely selected hydrogen atom other than the hydrogen atom of the hydroxyl group. As examples of the halogen atom, there can be cited chlorine, bromine, iodine, and fluorine atoms. Among the halogen atoms cited above, the chlorine atom proves to be particularly advantageous.

As examples of the compund of the foregoing definition, there can be cited 2-chloroethanol, 1-chloro-2-propanol, 3-chloro-1-propanol, 1-chloro-2-methyl-2-propanol, 4-chloro-1-butanol, 5-chloro-1-pentanol, 6-chloro-1-hexanol, 3-chloro-1,2-propane diol, 2-chlorocyclohexanol, 4-chlorobenzhydrol, (m,o,p)-chlorobenzyl alcohol, 4-chlorocatechol, 4-chloro-(m,o)-cresol, 6-chloro-(m,o)-cresol, 4-chloro-3,5-dimethyl phenol, chlorohydroquinone, 2-benzyl-4-chlorophenol, 4-chloro-1-naphthol, (m,o,p)-chlorophenol, p-chloro-α-methylbenzyl alcohol, 2-chloro-4-phenyl phenol, 6-chlorothymol, 4-chlororesorcinol, 2-bromoethanol, 3-bromo-1-propanol, 1-bromo-2-propanol, 1-bromo-2-butanol, 2-bromo-p-cresol, 1-bromo-2-naphthol, 6-bromo-2-naphthol, (m,o,p)-bromophenol, 4-bromoresorcinol, (m,o,p)-fluorophenol, p-iodophenol; 2,2-dichloroethanol, 2,3-dichloro-1-propanol, 1,3-dichloro-2-propanol, 3-chloro-1-(α-chloromethyl)-1-propanol, 2,3-dibromo-1-propanol, 1,3-dibromo-2-propanol, 2,4-dibromophenol, 2,4-dibromo-1-naphthol; 2,2,2-trichloroethanol, 1,1,1-trichloro-2-propanol, β,β,β-trichloro-tert-butanol, 2,3,4-trichlorophenol, 2,4,5-trichlorophenol, 2,4,6-trichlorophenol, 2,4,6-tribromophenol, 2,3,5-tribromo-2-hydroxy toluene, 2,3,5-tribromo-4-hydroxy toluene, 2,2,2-trifluoroethanol, α,α,α-trifluoro-m-cresol, 2,4,6-triiodophenol, 2,3,4,6-tetrachlorophenol, tetrachlorohydroquinone, tetrachloro-bis-phenol A, tetrabromo-bis-phenol A, 2,2,3,3-tetrafluoro-1-propanol, 2,3,5,6-tetrafluorophenol, and tetrafluororesorcinol.

PROCEDURE FOR PREPARATION OF CARRIER

The carrier mentioned above is obtained by causing a halogen-containing alcohol to come into contact with the product of contact of magnesium metal, a halogenated hydrocaron, and an alkoxy compound.

(1) Contact Among Magnesium Metal, Halogenated Hydrocarbon, and Alkoxy Compound

The method for establishing contact among the three components is not specifically limited. Virtually any method can be adopted for this contact. This contact can be accomplished, for example, by (1) a method which comprises simultaneously placing the three components into mutual contact, (2) a method which comprises preparatorily allowing magnesium metal to come into contact with the halogenated hydrocarbon and subsequently allowing the product of this contact or a compound obtained in advance by the contact of the two components, such as, for example, any of the compounds represented by the formulas, $ClMgCH_3$, $ClMgC_2H_5$, $ClMgC_3H_7$, $ClMgC_4H_9$, $ClMgi-C_4H_9$, $ClMgC_6H_{13}$, $ClMgC_8H_{17}$, $BrMgC_2H_5$, $BrMgC_4H_9$, $BrMgi-C_4H_9$, $IMgC_4H_9$, $ClMgC_6H_5$, and $BrMgC_6H_5$, which are known as Grignard reagents, to come into contact with the alkoxy compound, (3) a method which comprises suspending magnesium metal in a solution of the alkoxy compound and adding a solution of the halogenated hydrocarbon to the resultant suspension, or (4) a method which comprises placing the alkoxy compound and the halogenated hydrocarbon into mutual contact and subsequently adding magnesium metal to the product of the contact, for example.

The ratio of the amounts of the alkoxy compound and magnesium metal to be used is desired to be such that the matter of $OR^1$ groups in the alkoxy compound per magnesium atom in the magnesium metal exceeds 1, or preferably falls in the range of 3 to 5. In the case of an alkoxy compound represented by the formula, $X_2^1C(OR^1)Hd\ 2$, for example, the amount of the alkoxy compound is desired to exceed 0.5 mol, or preferably falls in the range of 1.5 to 2.5 mols, per gram atom of magnesium. In the case of an alkoxy compound represented by the formula, $X^1C(OR^1)_3$, the amount of the alkoxy compound is desired to exceed ⅓ mol, or preferably falls in the range of ½ to 5/3 mols, per gram atom of magnesium. The amount of the halogenated hydrocarbon to be used is desired to fall in the range of 1 to 2 mols, per gram atom of magnesium.

The contact reaction of the foregoing description is accomplished by stirring the combined components under such conditions that the contact temperature falls in the range of 40° to 250° C., preferably 60° to 120° C., and the contact time falls in the range of 1 to 10 hours. This reaction may be carried out, when desired, in the presence of the same inactive hydrocarbon such as, for example, an aliphatic, alicyclic, or aromatic hydrocarbon having 6 to 8 carbon atoms, as used in the drying of magnesium metal.

It is permissible, for the purpose of promoting this reaction, to use iodine, an alkyl iodide, or an inorganic halide such as calcium chloride, copper chloride, manganese chloride, or a hydrogen halogenide.

The solid product prepared by the reaction described above may be cleaned with a suitable cleaning agent such as, for example, the aforementioned inactive hydrocarbon before it is subjected to contact with the halogen-containing alcohol.

(2) Contact With Halogen-Containing Alcohol

Desirably, the contact of the magnesium-containing solid obtained as described in (1) above with the halogen-containing alcohol is accomplished by stirring the two components in the presence of an inactive medium. Examples of the inactive medium usable for this purpose include hydrocarbons such as pentane, hexane, heptane, octane, decane, cyclohexane, benzene, toluene, and xylene and halogenated hydrocarbons such as 1,2-dichloroethane, 1,2-dichloropropane, carbon tetrachloride, butyl chloride, isoamyl chloride, bromobenzene, and chlorotoluene.

The contact of the two components is generally carried out at a temperature in the range of −20° C. to +150° C. for a period in the range of 0.1 to 100 hours. When the contact entails evolution of heat, there can be adopted a method which comprises first bringing the two components into mutual contact gradually at a low temperature, elevating the temperature of the reaction system after the two components have been wholly added to each other, and subsequently continuing the contact.

The amount of the halogen-containing alcohol to be used is generally in the range of 0.05 to 20 gram mols, preferably 0.1 to 10 gram mols, per gram atom of magnesium in the solid.

The catalyst carrier acccording with the present invention is obtained as described above. This carrier, when necessary, may be washed with an inactive hydrocarbon and, when further necessary, dried.

The carrier of the present invention consists of particles which have a narrow size distribution and high uniformity in shape. The specific surface area of the carrier particles as measured by the BET method at the absorption temperature of liquefied nitrogen is less than 200 m²/g and the pore volume thereof is less than 0.30 cm³/g. As to the percentage composition, this carrier is made up of 5 to 25% by weight of magnesium atoms, 3 to 70% by weight of a halogen atom, and the balance to make up 100% by weight of organic compound and others.

As solid catalyst to be obtained by depositing on this carrier any of such transition metals as titanium, vanadium, and zirconium, which have been heretofore known as catalytic components for the polymerization of olefins manifests a highly desirable efficiency for catalysts. In the preparation of a catalyst by the use of this solid, there can be used a metal oxide such as silica or alumina or an inactive solid substance such as polyethylene, polypropylene, or some other polyolefin.

EFFECT OF THE INVENTION

The carrier according with the present invention consists of particles of highly satisfactory quality. The catalyst for the polymerization of an olefin prepared by using this carrier and consequently the polymer produced with this catalyst both enjoy uniformity of shape of their component particles. Thus, the catalyst manifests a high activity in the production of the polymer.

EXAMPLE

The present invention will be described more specifically below with reference to examples and applied examples. Wherever the term "percent (%)" is used in these examples, it shall be construed as meaning a percent by weight unless otherwise specified.

The particle size distribution of the catalyst carrier was determined by measuring the particle size distribution of a sample with a particle sizer, a product of Malvern Corp. marketed under trademark designation of "MALVERN 3600," and carrying out a calculation of the following formula using the results of the measurement.

$$PSDI = \log \frac{\text{Particle diameter of particles accounting for 90\% of cumulative weight}}{\text{Particle diameter of particles accounting for 10\% of cumulative weight}}$$

The melt index (MI) of the polymer was determined by the method defined in ASTM D1238. The bulk density thereof was determined by the method defined in ASTM D1895-69.

The particle size distribution of the polymer was measured with the standard sieves specified by W. S. Tyler Corp. The PSDI value consequently found was reported as the index of the particle size distribution.

EXAMPLE 1

Preparation of Magnesium-Containing Solid

In a reaction vessel provided with a reflux condenser and having an inner volume of 1 liter, 12.8 g of magnesium metal chips (purity 99.5% and average particle diameter 1.6 mm) and 250 ml of n-hexane were placed under an atmosphere of nitrogen gas and stirred at 68° C. for one hour. Then, the magnesium metal was taken out of the resultant mixture and dried at 65° C. under a vacuum to obtain preactivated magnesium metal.

Subsequently, a suspension obtained by adding to the magnesium metal 88 ml (0.53 mol) of ethyl ortho-formate [HC(OC₂H₅)₃] and 0.5 ml of methyl iodide solution of 10% of iodine was held at 55° C. The suspension and a 5 ml portion of a solution of 80 ml (0.8 mol) of n-butyl chloride in 100 ml of n-hexane added dropwise thereto were stirred for 50 minutes. Then, the remainder of the aforementioned solution was added dropwise thereto over a period of 80 minutes. The resultant combined liquid was stirred at 70° C. for four hours to undergo a reaction. Consequently, there was obtained a solid reaction product.

This reaction product was washed six times each with 300 ml of n-hexane at 50° C. and dried under a vacuum at 60° C. for one hour, to recover 55.6 g of white powdery magnesium-containing solid. This solid was found to contain 22.5% of magnesium and 34.0% of chlorine.

Contact with 2,2,2-trichloroethanol

In a reaction vessel provided with a reflux condenser, a stirrer, and a dropping funnel and having an inner volume of 300 ml, 6.3 g of the magnesium-containing solid and 50 ml of n-heptane were placed under an atmosphere of nitrogen gas to form a suspension. This suspension was kept stirred at room temperature and a mixed solution of 2.0 ml (0.02 m.mol) of 2,2,2-trichloroethanol and 11 ml of n-heptane was added to the suspension through the dropping funnel over a period of 30 minutes. The resultant combined liquid was stirred at 80° C. for one hour. The solid consequently formed therein was separated by filtration, washed six times each with 100 ml of n-hexane at room temperature, and dried under a vacuum at room temperature for one hour, to produce 8.1 g of a carrier according with the present invention. This carrier was found to contain 14.2% of magnesium and 47.5% of chlorine and possess a specific surface area of 162 $m^2/g$. The particle size distribution of the carrier was as shown below.

| Diameter (μm) | Less than 1.9 | 1.9 to 6.4 | 6.4 to 8.2 | 8.2 to 10.5 | 10.5 to 13.6 | 13.6 to 17.7 | 17.7 to 23.7 | 23.7 to 33.7 | 33.7 to 54.9 | Above 54.9 |
|---|---|---|---|---|---|---|---|---|---|---|
| Cumulative proportion (%) | 0.0 | 1.3 | 2.1 | 4.0 | 4.3 | 10.9 | 57.9 | 95.4 | 99.9 | 100 |

The PSDI value of the carrier was 0.31 and the average particle diameter thereof was 23 μm.

EXAMPLE 2

Preparation of Magnesium-Containing Solid

By following the procedure of Example 1, 8.3 g of magnesium metal was activated. Then, a suspension obtained by adding to the magnesium metal 140 ml of n-butyl ether and 0.5 ml of methyl iodide solution of 10% of iodine was kept at 55° C. To the suspension, a solution of 38.5 ml of n-butyl chloride in 50 ml of n-butyl ether was added dropwise over a period of 50 minutes. The resultant combined liquid was stirred at 70° C. for four hours to undergo a reaction. The reaction solution was kept at 55° C.

Then, 55.7 ml of $HC(OC_2H_5)_3$ was added dropwise to the reaction solution over a period of one hour. At this time, a solid was observed to form therein. After the dropwise addition was completed, the reaction mixture was left reacting at 60° C. for 15 minutes. The solid resulting from the reaction was washed six times each with 300 ml of n-hexane and dried under a vacuum at room temperature for one hour, to recover 31.6 g of a magnesium-containing solid having a magnesium content of 19.0% and a chlorine content of 28.9%.

Contact With 2,2,2-trichloroethanol

The procedure of Example 1 was repeated, except 6.3 g of the magnesium-containing solid obtained as described above was used instead. Consequently, there was obtained 8.0 g of a carrier according with the present invention. This carrier was found to contain 14.3% of magnesium and 47.7% of chlorine and possess a specific surface area of 149 $m^2/g$. The particle size distribution of the carrier was as shown below.

| Diameter (μm) | Less than 1.9 | 1.9 to 6.4 | 6.4 to 8.2 | 8.2 to 10.5 | 10.5 to 13.6 | 13.6 to 17.7 | 17.7 to 23.7 | 23.7 to 33.7 | 33.7 to 54.9 | Above 54.9 |
|---|---|---|---|---|---|---|---|---|---|---|
| Cumulative Proportion (%) | 0.0 | 1.5 | 2.8 | 4.0 | 7.2 | 16.3 | 38.5 | 65.4 | 93.6 | 100 |

The PSDI value of this carrier was 0.32 and the average particle diameter thereof was 22 μm.

EXAMPLES 3 THROUGH 8

Catalyst carriers according with the present invention and possessing the compositions and physical properties indicated below were obtained by following the procedure of Example 1, except the alkoxy compounds indicated below were used in the place of $HC(OC_2H_5)_3$.

| Example | Alkoxy Compound | Composition (%) Mg | Cl | Specific Surface Area ($m^2/g$) | PSDI | Average Particle Diameter (μm) |
|---|---|---|---|---|---|---|
| 3 | $CH_3CH(OC_2H_5)_2$ | 14.5 | 47.8 | 68 | 0.38 | 29 |
| 4 | $C(OC_2H_5)_4$ | 14.0 | 55.3 | 94 | 0.45 | 17 |
| 5 | $Si(OC_2H_5)_4$ | 14.3 | 49.9 | 138 | 0.32 | 7 |
| 6 | $Al(OC_2H_5)_3$ | 14.4 | 48.9 | 121 | 0.40 | 13 |
| 7 | $B(OC_2H_5)_3$ | 13.9 | 50.2 | 79 | 0.37 | 18 |
| 8 | $P(OC_2H_5)_3$ | 14.1 | 46.3 | 106 | 0.36 | 17 |

EXAMPLES 9 THROUGH 12

Catalyst carriers according with the present invention and possessing the composition and physical properties indicated below were obtained by following the procedure of Example 1, except the halogen-containing alcohols indicated below were used in the place of 2,2,2-trichloroethanol.

| Example | Halogen-Containing Alcohol | Composition (%) Mg | Composition (%) Halogen | Specific Surface Area (m²/g) | PSDI | Average Particle Diameter (μm) |
|---|---|---|---|---|---|---|
| 9 | 1,1,1-Trichloro-2-propanol | 19.2 | 42.9 | 141 | 0.39 | 27 |
| 10 | 2,2-Dichloroethanol | 18.0 | 45.3 | 131 | 0.45 | 21 |
| 11 | p-Chlorophenol | 19.6 | 24.0 | 101 | 0.41 | 24 |
| 12 | 1-Bromo-2-butanol | 19.4 | 43.1 | 113 | 0.50 | 26 |

EXAMPLES 13 THROUGH 15

Catalyst carriers according with the present invention and possessing the composition and physical properties indicated below were obtained by following the procedure of Example 1, except the amount of 2,2,2-trichloroethanol (TCE) to be used was varied as shown below.

| Example | Amount of TCE Used (ml) | Composition (%) Mg | Composition (%) Cl | Specific Surface Area (m²/g) | PSDI | Average Particle Diameter (μm) |
|---|---|---|---|---|---|---|
| 13 | 1 | 11.7 | 40.1 | 153 | 0.38 | 23 |
| 14 | 4 | 15.2 | 58.1 | 87 | 0.46 | 29 |
| 15 | 6 | 12.1 | 67.7 | 69 | 0.53 | 31 |

COMPARATIVE EXPERIMENT 1

A carrier was obtained by following the procedure of Example 1, except the contact with 2,2,2-trichloroethanol was omitted. This carrier was found to have a magnesium content of 23.4%, a chlorine content of 34.0%, a specific surface area of 201 m²/g, a PSDI value of 0.38, and an average particle diameter of 17 μm.

COMPARATIVE EXPERIMENT 2

A carrier was obtained by following the procedure of Example 5, except the contact with 2,2,2-trichloroethanol was omitted. This carrier was found to have a magnesium content of 22.9%, a chlorine content of 34.0%, a specific surface area of 215 m²/g, a PSDI value of 0.32, and an average particle diameter of 6 μm.

APPLIED EXAMPLE 1

Preparation of Catalyst Component

In a reaction vessel provided with a reflux condenser and a stirrer and possessing an inner volume of 300 ml, 6.3 g of the carrier obtained in Example 1 and 40 ml of toluene were placed to form a suspension and the suspension and 60 ml of titanium tetrachloride added thereto were stirred at 120° C. for two hours under an atmosphere of nitrogen gas. The solid substance consequently formed therein was separated by filtration and washed seven times each with 100 ml of n-hexane at room temperature, to obtain 5.7 g of a catalyst component having a titanium content of 3.8%.

Polymerization of Ethylene

In an autoclave of stainless steel (SUS 32) provided with a stirrer and having an inner volume of 1.5 liters, 10.2 mg of the catalyst component obtained as described above, 0.7 m.mol of triisobutyl aluminum, and 390 g of isobutane were placed under an atmosphere of nitrogen gas to produce a system for polymerization and the polymerization system was heated to 85° C. Then, hydrogen was introduced therein until the partial pressure of hydrogen reached 20 kg/cm² and ethylene was introduced therein until the partial pressure of ethylene reached 5.0 kg/cm². Ethylene was continuously fed to the autoclave, there to be polymerized, for 60 minutes at such a rate as to maintain the total pressure in the system constant. After the polymerization was completed, the contents of the autoclave were purged of the solvent and the unaltered ethylene. The white powdery polymer consequently formed was removed from the autoclave and dried under a vacuum at 70° C. for 10 hours, to obtain 245 g of powdery polyethylene having an MI value of 3.3 g/10 minutes and a bulk density of 0.38 g/cm³ [Kc(catalytic activity) 24,000 g of polymer per g of catalyst component]. The average particle diameter of this polyethylene was 750 μm and the PSDI value thereof was 0.33.

Applied Examples 2 Through 17

Preparation of catalyst components and polymerization of ethylene were carried out by following the procedure of Applied Example 1, except the carriers obtained in Examples 2 through 15, Comparative Experiment 1, and Comparative Experiment 2 were used in the place of the carrier obtained in Example 1. The results were as shown below.

| Applied Example | Carrier | Kc (g/g-cat.) | MI (g/10 min.) | Bulk Density (g/cm³) | PSDI |
|---|---|---|---|---|---|
| 2 | Example 2 | 26600 | 4.3 | 0.39 | 0.30 |
| 3 | Example 3 | 22800 | 2.8 | 0.37 | 0.33 |
| 4 | Example 4 | 17300 | 3.3 | 0.37 | 0.40 |
| 5 | Example 5 | 11900 | 3.8 | 0.39 | 0.29 |
| 6 | Example 6 | 14700 | 3.5 | 0.40 | 0.38 |
| 7 | Example 7 | 17500 | 4.1 | 0.37 | 0.33 |
| 8 | Example 8 | 16000 | 2.9 | 0.38 | 0.31 |
| 9 | Example 9 | 19000 | 3.1 | 0.35 | 0.35 |
| 10 | Example 10 | 20200 | 3.3 | 0.38 | 0.45 |
| 11 | Example 11 | 18400 | 3.7 | 0.38 | 0.41 |
| 12 | Example 12 | 22500 | 2.9 | 0.38 | 0.49 |
| 13 | Example 13 | 18700 | 3.3 | 0.39 | 0.35 |
| 14 | Example 14 | 26200 | 3.5 | 0.40 | 0.33 |
| 15 | Example 15 | 25300 | 3.8 | 0.40 | 0.33 |
| 16 | Comparative Experiment 1 | 19900 | 2.1 | 0.20 | 0.69 |
| 17 | Experiment 2 | 11600 | 2.1 | 0.39 | 0.31 |

Figure 1:
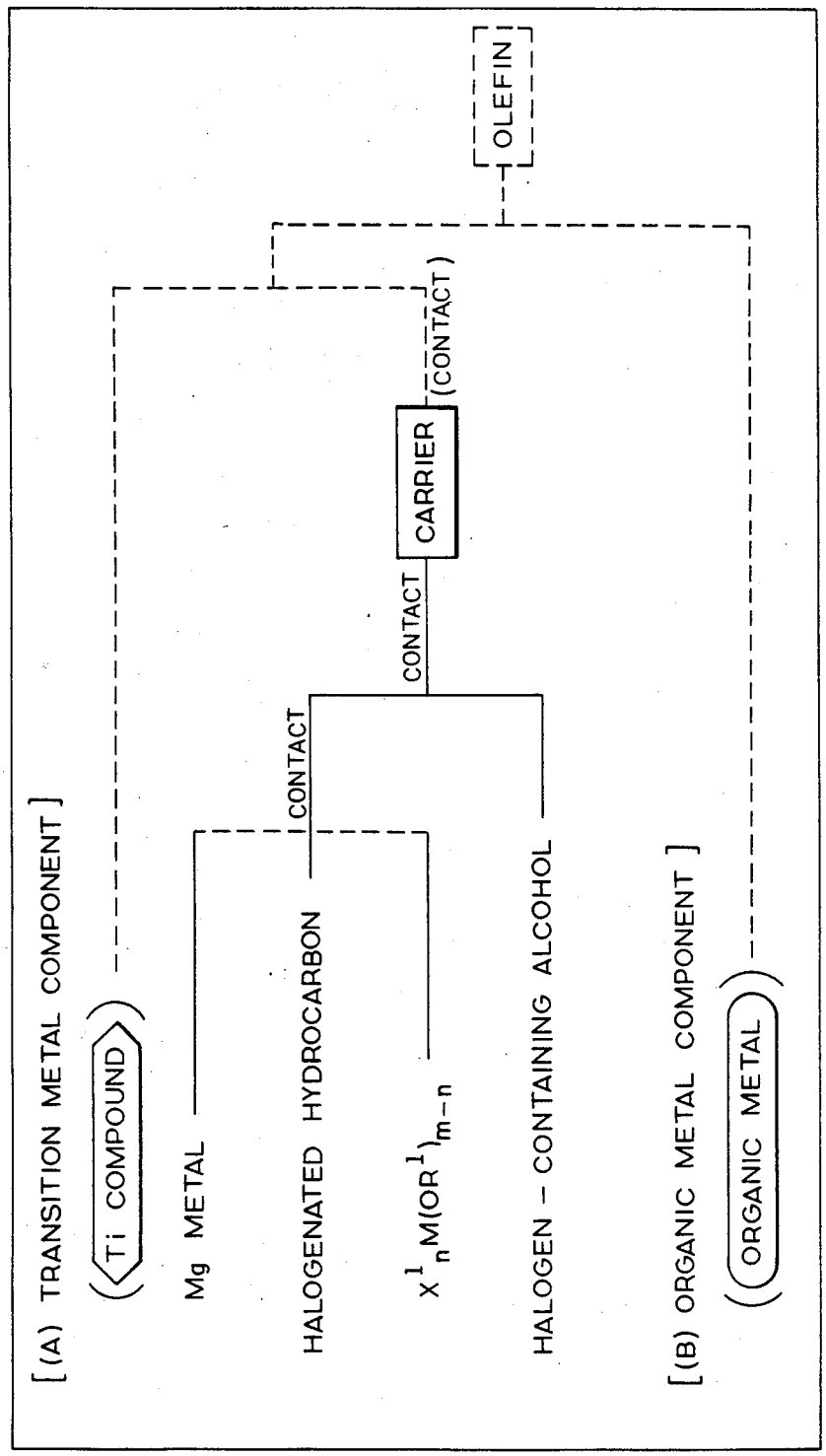
FIG. 1 is a flow chart illustrating the method according with the present invention.

What is claimed is:

1. An olefin polymerization catalyst carrier obtained by contacting
I. a magnesium-containing solid obtained by contact of (A) magnesium metal, (B) a halogenated hydrocarbon represented by the general formula RX, wherein R stands for an alkyl, aryl or cycloalkyl group having 1 to 20 carbon atoms and X for a halogen atom, and (C) an alkoxy compound of the general formula $X_n^1M(OR^1)_{m-n}$, wherein $X^1$ stands for a hydrogen atom, a halogen atom, or a hydrocarbon group having 1 to 20 carbon atoms, M stands for a boron, carbon, silicon, aluminum, or phosphorous atom, $R^1$ represents a hydrocarbon group having 1 to 20 carbon atoms, m represents the valency of said atom M, and $m > n \geq 0$, with II. a halogen-containing alcohol.

2. The catalyst carrier in accordance with claim 1 wherein the Mg metal and the halogenated hydrocarbon are contacted so as to provide a Grignard reagent.

3. The catalyst carrier in accordance with claim 1 wherein R is an alkyl group having from 1 to 8 carbon atoms, cyclohexyl or an aryl group having 6 or 7 carbon atoms and X is chlorine, the alkoxy compound (C) is selected from the group consisting of $HC(OC_2H_5)_3$, $CH_3CH(OC_2H_5)_2$, $C(OC_2H_5)_4$, $Si(OC_2H_5)_4$, $Al(OC_2H_5)_3$, $B(OC_2H_5)_3$ and $P(OC_2H_5)_3$, and the halogenated alcohol is selected from 2,2,2-trichloroethanol, 1,1,1-trichloro 2-propanol, 2,2L-dichloroethanol, p-chlorophenol and 1-bromo-2-butanol.

4. The catalyst carrier in accordance with claim 3 wherein the halogenated hydrocarbon is n-butyl chloride and the compound represented by the formula $X_n^1M(OR^1)_{m-n}$ is one of orthoformate or ethyl orthoformate.

5. The catalyst carrier in accordance with claim 1 wherein the alkoxy compound (C) is contacted with the magnesium compound in the amount such that the number of $OR^1$ groups in the alkoxy compound per magnesium atom exceeds 1.

6. The catalyst carrier in accordance with claim 5 wherein the ratio of alkoxy groups to the magnesium is in the range of 3 to 5.

7. The catalyst carrier in accordance with claim 1 wherein the amount of halogenated alcohol contacted with the magnesium-containing solid is in the range of 0.05 to 20 per gram atom of magnesium in the solid.

8. A method for the production of an olefin polymerization catalyst carrier comprising contacting I. a magnesium-containing solid obtained by contact of (A) magnesium metal, (B) a halogenated hydrocarbon represented by the general formula RX, wherein R represents an alkyl, aryl or cycloalkyl group having 1 to 20 carbon atoms and X for a halogen atom, and (C) a compound of the general formula $X_n^1M(OR^1)_{m-n}$, wherein $X^1$ represents a hydrogen atom, a halogen atom, or a hydrocarbon group having 1 to 20 carbon atoms, M represents a boron, carbon, silicon, aluminum, or phosphorus atom, $R^1$ represents a hydrocarbon group having 1 to 20 carbon atoms, m represents the valency of said atom M, and $m > n \geq 0$, with II. a halogen-containing alcohol.

* * * * *